G. STERN.
APPARATUS FOR AUTOMATICALLY REGULATING THE TEMPERATURE OF A SUPPLY OF LIQUID.
APPLICATION FILED AUG. 25, 1913.
1,156,505.   Patented Oct. 12, 1915.
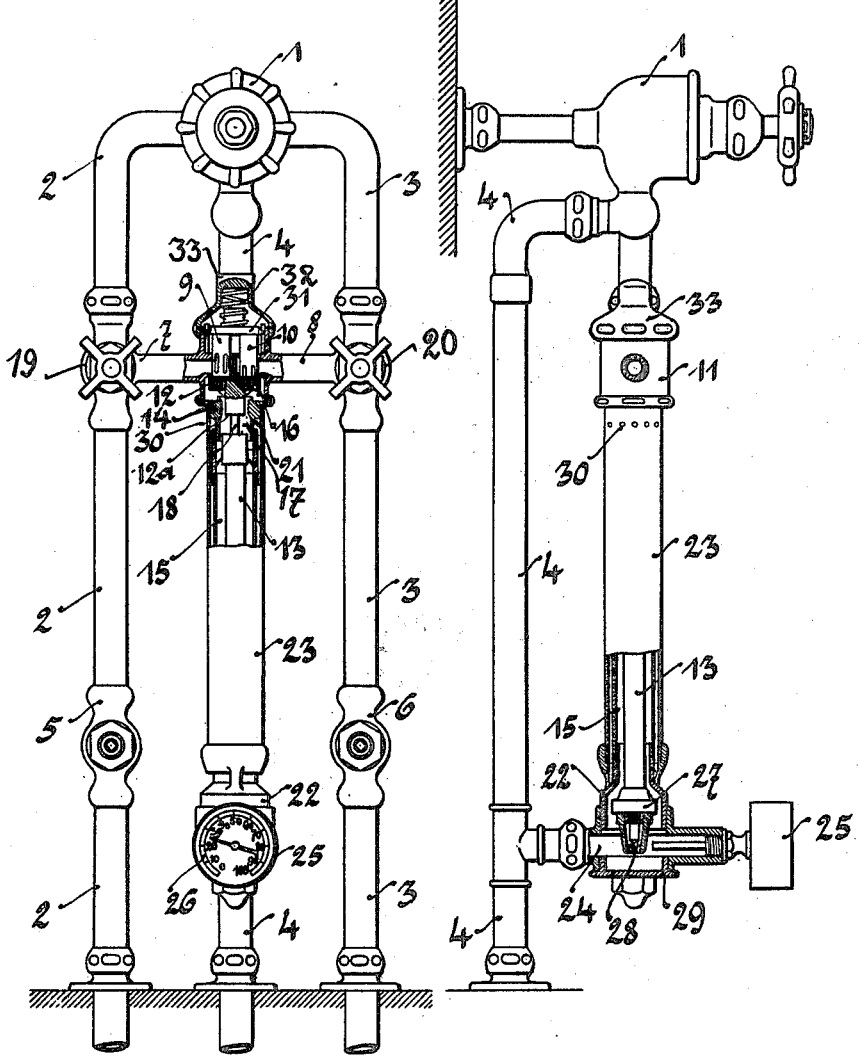

UNITED STATES PATENT OFFICE.

GUIDO STERN, OF FRANKFORT-ON-THE-MAIN, GERMANY, ASSIGNOR TO THE FIRM OF BAMBERGER LEROI & COMPANY, OF FRANKFORT-ON-THE-MAIN, GERMANY.

APPARATUS FOR AUTOMATICALLY REGULATING THE TEMPERATURE OF A SUPPLY OF LIQUID.

1,156,505. Specification of Letters Patent. Patented Oct. 12, 1915.

Application filed August 25, 1913. Serial No. 786,473.

*To all whom it may concern:*

Be it known that I, GUIDO STERN, a citizen of the German Empire, residing at Frankfort-on-the-Main, in Germany, have invented certain new and useful Improvements in Apparatus for Automatically Regulating the Temperature of a Supply of Liquid, of which the following is a specification.

The object of this invention is to provide improved means whereby a supply of liquid at a constant temperature is obtained, as for example to a bath which is to be kept for a lengthy period at a predetermined temperature.

The invention is illustrated in the accompanying drawings, in which—

Figure 1 is an elevation of the apparatus, partly in section, and Fig. 2 an elevation viewed at right angles to the plane of Fig. 1, also partly in section.

The apparatus illustrated comprises a mixing valve 1, to the housing of which are joined pipes 2 and 3 for the supply of hot and cold water respectively, and a pipe 4 through which the water flows to the bath or other appliance for which it is required. The pipes 2 and 3 are controlled by stop cocks 5 and 6 respectively, and are connected by branch pipes 7 and 8 respectively to a valve housing 11 containing a hot water valve 9 and a cold water valve 10. Two-way valves 19 and 20 in the pipes 2 and 3 allow of admitting the water alternatively to the valve 1 or to the pipes 7 and 8 respectively. The valves 9 and 10 are fixed to a valve plate 12, which has a depending stem 12ª and is arranged above a thermostat rod 13 of freely expanding material having at its upper end a short boss 18 abutting against the stem 12ª. A lead plate 31 rests on the valves 9 and 10, and a coiled spring 32 is placed between this plate and the cover 33 of the valve housing. The plate 12 is arranged in a mixing chamber 16 having at the bottom an orifice, which opens into a conduit 15 containing the thermostat 13, and is surrounded by a seat 14 for the plate 12. Permanent communication between the mixing chamber 16 and the conduit 15 is afforded by a duct 17. The valves 9 and 10 control the flow of hot and cold water from the pipes 7 and 8 respectively, to the mixing chamber 16, and are designed so that the valve 9 is closed by the rising of the plate 12, and the valve 10 is closed by the lowering of the said plate. The conduit 15 communicates at the bottom with the pipe 4, by means of a union 24.

The conduit 15 makes at the top a sliding joint with a union 21 screwed to the wall of the chamber 16, and is soldered or otherwise fixed at the bottom to a housing 22 inclosing the foot 27 of the thermostat 13. The conduit 15 is surrounded by an outer tube or jacket 23, which is fixed to the union 21 and to the housing 22. By virtue of this arrangement the conduit 15 does not interfere with the action of the thermostat, and the expansion and contraction of the thermostat do not affect the outer tube or jacket 23. The latter is provided with holes 30. A temperature indicator 25 with a dial 26 is fitted to the housing 22, to indicate the temperature of the water flowing from the conduit 15 to the pipe 4. The foot 27 of the thermostat 13 is screwed into a seat in the housing, and has a shank with a squared end 28, to which access can be had, on unscrewing a cap 29, so that the thermostat can be screwed up or down by means of a key placed on the shank, for the purpose of regulating its action.

The action of the apparatus is as follows: The valves 19 and 20 being turned to admit hot and cold water to the valve 1, the latter is opened, and a mixture of the hot and cold water flows through pipe 4 to the place where it is required, say a bath. When a certain quantity of water has been admitted to the bath the valve 1 is closed, and the valves 19 and 20 are turned to admit water to the pipes 7 and 8. This water is admitted by the valves 9 and 10 to the mixing chamber 16 and flows thence through conduit 15 and pipe 4 to the bath. Acting under the influence of the temperature in the conduit 15 the thermostat adjusts the valves 9 and 10 so that exactly the required mixture of hot and cold water is admitted. If the temperature from any cause exceeds the desired value, the thermostat rod expands and partly or wholly closes the valve 9, until the inflow of cold water has reduced the temperature as required. If, on the other hand, the temperature falls, the rod contracts, thereby increasing the admission of hot water and reducing the admission of cold water, till the proper temperature is restored again.

What I claim as my invention and desire to secure by Letters Patent of the United States is:—

1. In an apparatus for the purpose set forth, the combination of supply conduits for two liquids at different temperatures, a delivery conduit joined to said supply conduits, a mixing valve at the junction of said supply conduits with said delivery conduit, branch conduits joined to said supply conduits, two way valves at the junctions of said branch conduits with said supply conduits, a second delivery conduit joined at one end to said branch conduits and at the other end to the first mentioned delivery conduit, valves severally controlling the flow of liquid from said branch conduits to said second delivery conduit, and a thermostatic device influenced by the temperature in said second delivery conduit, arranged to actuate the last mentioned valves, whereby the opening of either of the last mentioned valves is accomplished by the closing of the other valve.

2. A device of the kind described comprising a main pipe and a thermostat supporting pipe, a hot and cold water pipe supported on opposite sides of the thermostat supporting pipe, the hot and cold water pipes being in communication with the main pipe at the upper ends thereof, branch pipes for connecting the hot and cold water pipes with the thermostat supporting device at a point below the ends of the hot and cold water pipes, a valve casing connecting the thermostat supporting pipe and branch pipes, valves in the valve casing, said valves having openings adapted to aline with the interior of the branch pipes, a thermostat for supporting the valves, said thormostat being positioned in the thermostat support pipe, whereby water flowing through the branch pipes and thermostat supporting pipe causes the openings of one valve to aline with its adjacent branch pipe while the opposite valve prevents communication between the thermostat supporting pipe and the valve adjacent the second mentioned branch pipe.

In witness whereof I have signed this specification in the presence of two witnesses.

GUIDO STERN.

Witnesses:
ALFONS VAN ROFSEN,
CARL GRUND.